Aug. 23, 1949.          H. C. RHODES                2,479,864
           METHOD FOR DISTRIBUTING MOISTURE IN BREAD DOUGH
                         Filed April 7, 1945
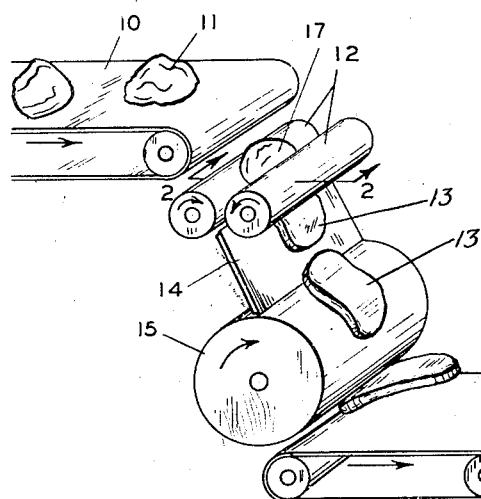
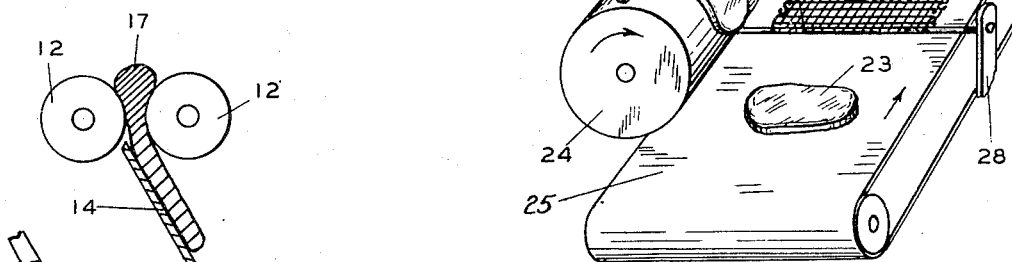
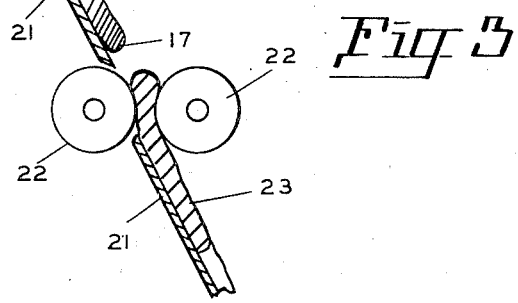
INVENTOR.
HERBERT C. RHODES
ATTORNEY Patented Aug. 23, 1949

2,479,864

UNITED STATES PATENT OFFICE 2,479,864

METHOD FOR DISTRIBUTING MOISTURE IN BREAD DOUGH

Herbert C. Rhodes, Portland, Oreg., assignor to The Standard Stoker Company, Inc., a corporation of Delaware Application April 7, 1945, Serial No. 587,100

4 Claims. (Cl. 107—54)

This invention relates generally to the bakers' art and particularly to a method of and apparatus for distributing moisture in bread.

The main object of this invention is to devise a process and apparatus for preparing dough for baking bread in which the moisture content will be uniformly distributed throughout the entire mass.

The second object is to so prepare bread dough that the completed loaf will not have a well-known and objectionable "dry end".

The third object is to so process the dough that it is immaterial whether it is rolled laterally or longitudinally in its final step before being placed in the pan.

I accomplish these and other objects in a manner set forth in the following specification as illustrated in the accompanying drawing, in which Fig. 1 is a somewhat diagrammatic perspective view of the apparatus showing the various steps through which the dough passes.

Fig. 2 is a section taken along the line 2—2 in Fig. 1, showing the first step in which the moisture is concentrated in one portion of the dough strip.

Fig. 3 is a section showing the strip of dough formed by the apparatus in Fig. 2 in a reverse position and passing through a second set of rolls for the final distribution of the moisture.

Similar numerals refer to similar parts throughout the several views.

Referring in detail to the drawing, there is shown a conveyor 10 from which chunks of dough 11 are received from a loaf preparing machine, whose unrelated details are not shown. Below the discharge end of the conveyor 10 are shown a pair of rolls 12, between which the dough 11 passes to form an elongated strip 13, which rides down along the inclined plate 14 to the cylinder 15, where it is inverted upon the conveyor 16.

It will be noted in Fig. 2 that the end 17, which is the last to pass through the roll 12, contains the most moisture. It will be noted in Fig. 3 that the strip 13 approaches the second set of rolls 18 with the moist end 17 foremost. The strip 20, which emerges from the rolls 18, passes over the plate 21 and through a third set of rolls 22 to complete the moisture distributing action. The strip 23 which emerges from the rolls 22 will be found to have a uniform moisture content throughout its length and breadth. This may be rolled either longitudinally or transversely.

In the present case, I prefer to pass the strip 23 over the drum 24 which deposits it on the conveyor 25, moving transversely with relation to the plan of the previously described movement of the strip.

Attention is drawn to my co-pending application, Serial Number 577,223, filed February 10, 1945, over which the process and apparatus described herein is an improvement.

From the foregoing it can be seen that the strip 20 or 23 can be deposited directly upon the conveyor 25 either in the direction illustrated or in the line of travel during the first steps in the process without departing from the spirit of this invention, or detracting from the quality of the finished product. That is to say, once the moisture content of the strip has been rendered uniform throughout its length and breadth, it is immaterial whether it is curled lengthwise or transversely.

It is desirable to provide a wire chain cloth 26, which is supported by the rod 27 on the standards 28 at one end and permitted to ride upon the conveyor 25 at the other end, the purpose of which is to roll the strip of dough 23 and make same ready for the pan.

While I have thus illustrated and described my invention, it is not my desire to be limited to the precise form shown herein, and I intend to cover such forms and modifications of the invention as fall fairly within the appended claims.

I claim:

1. In a method of preparing dough for baking, the steps of treating quantities of dough of such weight and size as to form loaves of bread, which include applying rolling pressure to opposite sides of successive dough masses while the spaced masses move continuously in a single path whereby to elongate the masses into strips thus reducing the gaseous contents and concentrating the moisture content in the rear ends of the moving strips, turning the elongated strips front end to rear end while moving in said path, and then applying rolling pressure to the flattened faces of the reversed strips to elongate the strips further, whereby in the last recited elongations the moisture concentrated ends will precede the other ends of the strips so that moisture content of each strip will be uniformly distributed throughout the strip as the strips are ready for the usual coiling step which normally follows immediately.

2. A method of preparing dough for baking wherein the moisture content of the dough is distributed throughout the dough to secure an evenness of cellular structure and a uniformity of fine grain structure, consisting in compressing a mass of dough into a sheet by application of pressure progressively from the leading to the trailing edge of the dough mass while moving the dough in a unidirectional path of movement, then compressing the sheet of dough progressively of its length by first engaging said trailing edge of the sheet of dough to redistribute throughout the sheet the higher concentration of moisture contained in said trailing edge as resulting from the first compressing of the dough while continuing to move the sheet in the same unidirectional path of movement as first mentioned.

3. A method of preparing dough for baking wherein the moisture content of the dough is distributed throughout the dough, consisting in rolling successively uniformly spaced masses of dough into elongated strips for concentrating the moisture content of each of the masses in the rear end of each of the strips while moving the masses of dough and elongated strips continuously in the same directional line of movement, then inverting the strips while continuously moving them in the same directional line of movement as first mentioned wherein the bottom face of each strip becomes the top face and the leading edge of each strip becomes the trailing edge and the moist rear end becomes the leading edge of each of the strips, then applying rolling pressure to the inverted strips progressively of their length to further flatten the strips and redistributing throughout each strip the moisture contained therein while continuously moving the strips in the same directional line of movement as first mentioned.

4. A method of preparing dough for baking consisting in compressing spaced moving masses of dough into elongated sheets by application of pressure progressively from the leading to the trailing edge of the dough masses for moving moisture from the forward portion of the sheet and concentrating moisture in the rear portion of the sheet, moving the sheets, as formed from the dough masses, in a forward direction and maintaining the sheets in spaced relation, then inverting successively spaced sheets during their forward movement and causing the ends of each sheet to be reversely disposed wherein the moisture concentrated rear portion of each sheet will be the leading or advancing end thereof, then compressing the spaced inverted sheets by application of pressure progressively of their length and redistributing throughout each sheet the moisture contained therein while the sheets continue to move in the spaced forward direction first mentioned.

HERBERT C. RHODES.

REFERENCES CITED

The following references are of record in the file of this patent:

UNITED STATES PATENTS

| Number | Name | Date |
|---|---|---|
| Re. 22,399 | Fonken | Dec. 7, 1943 |
| 787,274 | Burns | Apr. 11, 1905 |
| 806,869 | Burns | Dec. 12, 1905 |
| 975,932 | Callow et al. | Nov. 15, 1910 |
| 1,210,496 | Lawrence | Jan. 2, 1917 |
| 1,369,724 | Benz, Jr. | Feb. 22, 1921 |
| 1,430,616 | Benz, Jr. | Oct. 3, 1922 |
| 1,643,366 | Benz, Jr. | Sept. 27, 1927 |
| 1,657,018 | Larraburu | Jan. 24, 1928 |
| 1,699,815 | Smith | Jan. 22, 1929 |
| 1,800,417 | Van Houten | Apr. 14, 1931 |
| 2,000,384 | Frantz | May 7, 1935 |
| 2,162,079 | Grabowski et al. | June 13, 1939 |
| 2,275,714 | Anetsberger et al. | Mar. 10, 1942 |
| 2,373,012 | Burdett et al. | Apr. 3, 1945 |

FOREIGN PATENTS

| Number | Country | Date |
|---|---|---|
| 21,480 | France | July 6, 1920 |
| 501,285 | France | Jan. 12, 1920 |